(12) United States Patent
Elliott (10) Patent No.: US 10,081,937 B2
(45) Date of Patent: Sep. 25, 2018

(54) UNIVERSAL DRAIN CUFF

(71) Applicant: EURAMAX INTERNATIONAL, INC., Norcross, GA (US)

(72) Inventor: Benjamin R. Elliott, Chattanooga, TN (US)

(73) Assignee: OMNIMAX INTERNATIONAL, INC., Norcross, GA (US)

( * ) Notice: Subject to any disclaimer, the term of this patent is extended or adjusted under 35 U.S.C. 154(b) by 464 days.

(21) Appl. No.: 14/869,054

(22) Filed: Sep. 29, 2015

(65) Prior Publication Data

US 2016/0090727 A1    Mar. 31, 2016

Related U.S. Application Data

(60) Provisional application No. 62/057,370, filed on Sep. 30, 2014.

(51) Int. Cl.
    *F16L 25/14*      (2006.01)
    *E03F 5/04*       (2006.01)
    (Continued)

(52) U.S. Cl.
    CPC .............. *E03F 5/041* (2013.01); *E03C 1/12* (2013.01); *E03C 1/1225* (2013.01);
    (Continued)

(58) Field of Classification Search
    CPC ... E03C 1/12; E03F 7/06; E03F 5/0411; F16L 25/14
    (Continued)

(56) References Cited

U.S. PATENT DOCUMENTS 4,440,406 A * 4/1984 Ericson ................... F16L 25/14
                                                     277/607
4,703,956 A * 11/1987 Keech ..................... F16L 25/14
                                                     285/133.3

(Continued)

FOREIGN PATENT DOCUMENTS

AU    2015101213    *  7/2016    ............. F16L 25/14
EP    0223510 A1   *  5/1987    ........... B08B 15/002
      (Continued)

OTHER PUBLICATIONS

U.S. Appl. No. 29/540,919, "Ex-Parte Quayle Action", Nov. 18, 2016, 7 pages.

(Continued)

*Primary Examiner* — David Bochna
(74) *Attorney, Agent, or Firm* — Kilpatrick Townsend & Stockton, LLP (57) ABSTRACT

A drainage pipe fitting includes a cuff that permits the fitting to be coupled with pipes or fittings of various sizes. The cuff includes a plurality of sloped surfaces. For example, the cuff may include a first set of sloped surfaces and a second set of sloped surfaces on an interior of the cuff for receiving different-sized pipes or fittings on the interior of the cuff. The cuff may also include a third set of sloped surfaces, a fourth set of sloped surfaces, and a fifth set of sloped surfaces on an exterior of the cuff for receiving further pipes or fittings of different sizes on the exterior of the cuff. If desired, the cuff can include more or less sets of sloped surfaces. In some cases the sloped surfaces are arranged on internal and external fins of the cuff.

21 Claims, 7 Drawing Sheets

(51) Int. Cl.
  *E03F 7/00* (2006.01)
  *E03F 7/06* (2006.01)
  *E03C 1/12* (2006.01)
  *E03C 1/122* (2006.01)

(52) U.S. Cl.
  CPC .............. *E03F 5/0411* (2013.01); *E03F 7/00* (2013.01); *E03F 7/06* (2013.01); *F16L 25/14* (2013.01)

(58) Field of Classification Search
  USPC ........................................ 285/12, 59, 60, 56
  See application file for complete search history.

(56) References Cited

U.S. PATENT DOCUMENTS

| | | | | |
|---|---|---|---|---|
| 4,712,812 A | * | 12/1987 | Weir, III | F16L 25/14 285/906 |
| 4,722,556 A | * | 2/1988 | Todd | F16L 25/0036 285/12 |
| 4,875,719 A | * | 10/1989 | Mylett | F16L 25/14 285/239 |
| 5,700,039 A | * | 12/1997 | Manning | F16L 25/14 285/148.17 |
| D596,272 S | | 7/2009 | Russell et al. | |
| 7,722,091 B1 | * | 5/2010 | Brockington | F16L 25/14 285/361 |
| 7,964,095 B1 | | 6/2011 | Graybeal et al. | |
| D702,903 S | | 4/2014 | Nhem et al. | |
| D703,893 S | | 4/2014 | Nhem et al. | |
| D703,894 S | | 4/2014 | Nhem et al. | |
| D733,264 S | | 6/2015 | Fain et al. | |
| D749,706 S | | 2/2016 | Johansen | |
| 2015/0198274 A1 | * | 7/2015 | Farland | F16L 25/14 285/7 |

FOREIGN PATENT DOCUMENTS

| | | | | |
|---|---|---|---|---|
| FR | 2665217 A1 | * | 1/1992 | ............ F01N 3/0211 |
| FR | 2824571 A1 | * | 11/2002 | ............ E02D 29/12 |
| FR | 2935772 A1 | * | 3/2010 | ............. F16L 25/14 |

OTHER PUBLICATIONS

U.S. Appl. No. 29/540,919, "Notice of Allowance", dated Feb. 13, 2017, 7 pages.

\* cited by examiner

UNIVERSAL DRAIN CUFF

CROSS REFERENCE TO RELATED APPLICATION

The present application claims the benefit of U.S. Provisional Application No. 62/057,370 filed on Sep. 30, 2014 and entitled "UNIVERSAL DRAIN CUFF," which is hereby incorporated by reference in its entirety.

FIELD OF THE INVENTION

This application relates to drain fitting components, and more particularly (although not necessarily exclusively), to cuffs that permit alternative attachment of components of various sizes to a single drain fitting component.

BACKGROUND

Drainage pipes come in a variety of sizes. Conventionally, a large number of fittings (e.g., caps, joints, adaptors) may be needed when working with drainage pipes, as a different-sized fitting may be needed to accommodate each particular size of drainage pipe. This can cause various issues. For example, maintaining a suitable number of fittings to facilitate work with a variety of pipe sizes can be expensive. Additionally, delays may result from searching for and/or acquiring a fitting that is appropriate for a particular size of pipe encountered among drainage pipes or fittings of different sizes.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Disclosed herein are drainage pipe fittings that include cuffs that permit the fitting to be coupled with pipes or fittings of various sizes. Different sets of sloped surfaces may be provided for coupling the cuff with different sizes of pipes or fittings. The sloped surfaces can be formed by flanges or fins extending from a generally cylindrical surface of a cuff and/or may be formed as a continuous surface along the circumference of the cuff.

In some cases, the cuff includes a first set of sloped surfaces and a second set of sloped surfaces on an interior of the cuff for receiving different-sized pipes or fittings on the interior of the cuff. Similarly, the cuff also includes a third set of sloped surfaces, a fourth set of sloped surfaces, and a fifth set of sloped surfaces on an exterior of the cuff for receiving further pipes or fittings of different sizes on the exterior of the cuff. For example, the second set of surfaces may allow a 3-inch corrugated pipe to be received inside the cuff near an open end of the cuff, and the first set of surfaces may allow a 3-inch Schedule 40 PVC pipe to be received inside the cuff further from the open end. Continuing this example, the third set of surfaces may allow a 4-inch Schedule 40 PVC pipe to be received on the exterior or outside of the cuff at a first (shortest) distance from the open end, the fourth set of surfaces may allow a 4-inch corrugated pipe to be received on the exterior the cuff at a second (intermediate) distance from the open end, and the fifth set of surfaces may allow a 4-inch sewer fitting to be received on the exterior the cuff at a third (greatest) distance from the open end. The cuff may be provided on various types of drainage pipe fittings, including, but not limited to drainage caps, end caps, pop-up emitters, and adaptors.

BRIEF DESCRIPTION OF THE DRAWINGS

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed herein are universal fittings for drainage pipes. Universal fittings disclosed herein include a universal cuff that is configured to interface with drainage pipes or fittings of various sizes. The interior radial surface and the exterior radial surface (also commonly referred to as the inner diameter and outer diameter) of the universal cuff can each include contouring to provide attachment surfaces for different sizes of drainage pipes. For example, the universal cuff may include various surfaces arranged along a length of the cuff. The surfaces can be formed by flanges or fins extending from a generally cylindrical surface of a cuff and/or may be formed as a continuous surface along the circumference of the cuff. The surfaces can be grouped into sets, and the surfaces in a given set may be arranged for engaging a particular size and/or type of pipe or fitting. The surfaces in one set may be sloped by a different amount, sized differently, and/or spaced differently from surfaces in another set, for example, such that each set is particularly suited for engaging a different size and/or type of pipe or fitting than other sets. The sets of surfaces can be arranged relative to one another on the cuff so that the cuff can alternatively engage pipes or fittings of various sizes. For example, different sets of surfaces arranged on an interior of the cuff may permit the cuff to alternatively receive different sizes of pipe within the cuff, while different sets of surfaces arranged on an exterior of the cuff may permit varying sizes of pipe to be received alternatively about the exterior of the cuff.

Figure 1:
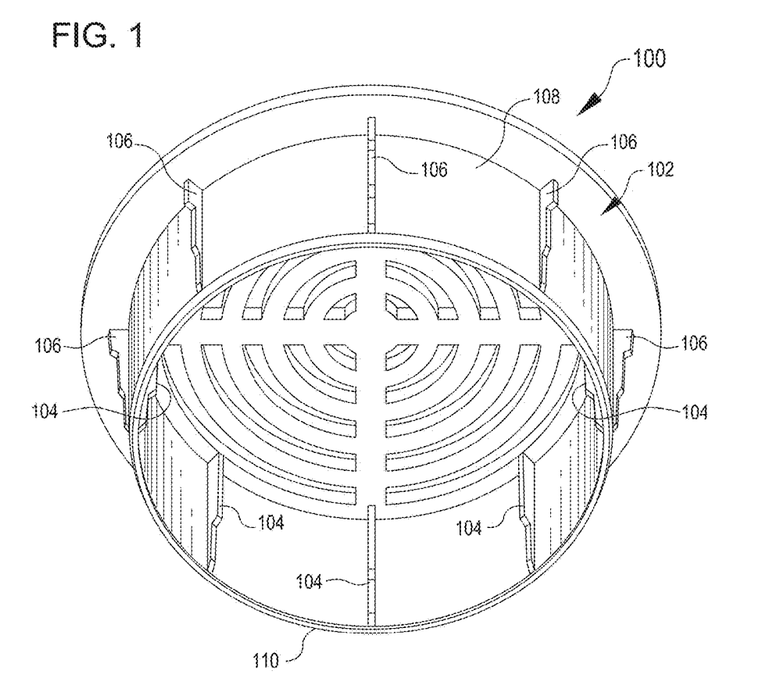
FIG. 1 is a bottom perspective view of a drain cap having a universal cuff according to a non-limiting example.

Referring now to the drawings, FIG. 1 is a bottom perspective view of a drain cap 100 having a universal cuff 102. The universal cuff 102 is shown with internal fins 104 and external fins 106 extending from a body 108. As illustrated, the internal fins 104 and the external fins 106 provide various surfaces for engaging different sizes of pipes and/or fittings. Alternatively, the surfaces may instead be provided by contouring formed as a continuous surface along the perimeter or circumference of the body 108.

The body 108 defines a hollow tube. For example, in FIG. 1, the body 108 generally has the shape of a cylinder with a length extending between two circular ends. An open end 110 of the body 108 permits different sizes of pipes or fittings to be inserted into the interior of the cuff 102. Different sizes of pipes or fittings may also be received about the open end 110 and engaged on an exterior of the cuff 102.

Figure 2:
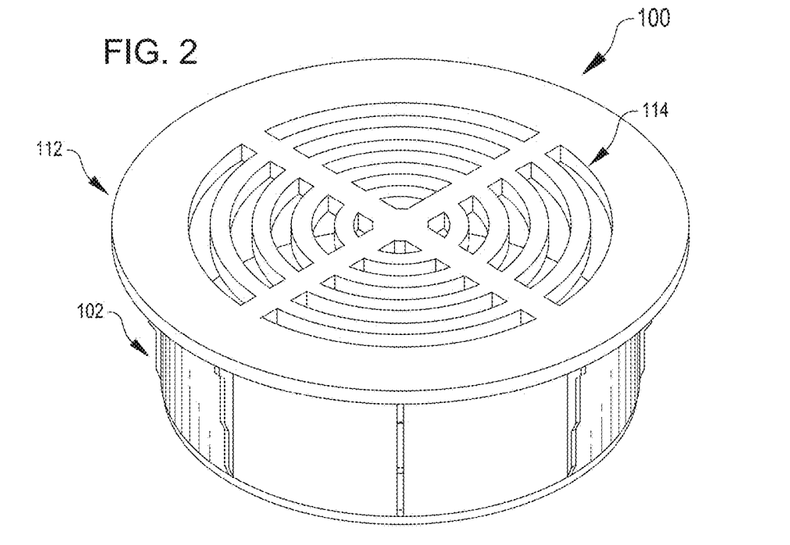
FIG. 2 is a top perspective view of the drain cap of FIG. 1.

FIG. 2 is a top perspective view of the drain cap 100. In addition to the universal cuff 102, the drain cap 100 includes an upper portion 112. The upper portion 112 is shown in FIGS. 1-2 as a disc with drainage apertures 114. For example, the drain cap 100 may allow fluid to flow through the drain cap 100 into a pipe coupled with the drain cap 100 while preventing debris that is larger in size than a size of the drainage apertures 114 from flowing into the pipe.

The upper portion 112 of the drain cap 100 can be connected with the cuff 102 in any suitable manner, including being integrally formed together (such as in an injection molding process, a casting process, a three-dimensional printing process, or other process for forming a continuous part) or being joined together from multiple pieces (such as through bonding, adhesives, welding, or other joining methods). Similarly, the internal fins 104 and/or the external fins 106 can be connected with the body 108 by any of these methods or combinations thereof.

Additionally, although the cuff 102 is shown in FIGS. 1-2 as part of the drain cap 100, the cuff 102 additionally or alternatively can be provided on other types of fitting components for drainage systems or other pipes. Non-limiting examples of other fitting components are also described herein with respect to FIGS. 5-11. Similar to the drainage cap 100, features described in those examples can be connected with one another by any suitable method or combination of methods.

Figure 3:
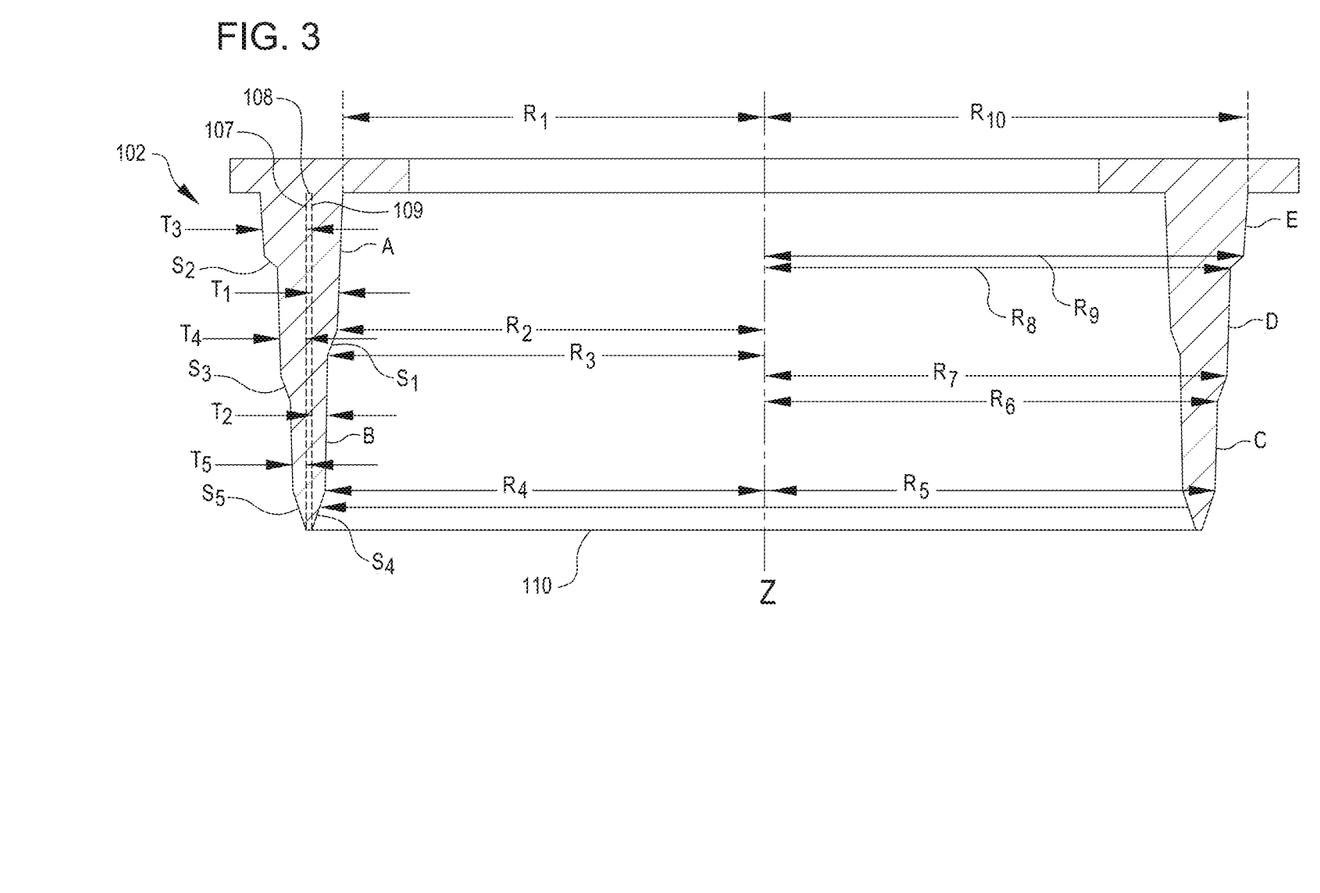
FIG. 3 is a schematic view showing an example of a cross-sectional profile of the drain cap of FIG. 1.

FIG. 3 is a schematic view showing an example of a cross-sectional profile of the universal cuff 102. The profile may be formed by the internal fins 104 and the external fins 106 shown in FIGS. 1-2, for example. Although the universal cuff 102 in FIGS. 1-2 is shown with an arrangement corresponding to eight internal fins 104 and eight external fins 106, any suitable number of fins may be used (e.g., to form the profile), including two or more fins and/or differing numbers of internal fins 104 and external fins 106. Additionally, in some cases, an odd number of fins (e.g., three, five, seven, or more) may be used, such as to define a circular cross-section with a diameter corresponding to distances shown between matching surfaces of the profile depicted in FIG. 3. For example, three internal fins could be equally spaced about the circumference of the universal cuff to define circular cross-sections of desired diameters even though that spacing of the fins would not result in the fins being positioned on opposite ends of a diameter through the center of the circular cross-section. In other cases, the profile or corresponding circular cross-sections may be formed by rings or other continuous surfaces, e.g., formed along the perimeter or circumference of the body 108 of FIG. 1 in place of parts or all of the internal fins 104 and the external fins 106. Compared to continuous surfaces, fins may provide advantages such as reduced amounts of material during manufacturing, greater ease of manufacturing, and/or increased aesthetic appeal; however, either structure may provide suitable contouring for the universal cuff 102.

The profile in FIG. 3 provides five sets of surfaces, individually referenced as A-E, although the cuff can be configured to have more or less surfaces as desired. Surfaces A-E are arranged relative to one another to permit the cuff 102 to engage different sizes of pipes or fittings. For example, the surfaces may be radially offset from one another, e.g., interior surfaces can be located more radially outwards as they progress toward the open end 110 and exterior surfaces can be located more radially outwards as they progress away from the open end 110. This arrangement permits pipes of different sizes to pass surfaces near the open end 110, such as to reach and engage surfaces located further from the open end 110.

As an illustrative example, a second set of surfaces B located on an interior of the cuff 102 near the open end 110 may be offset toward the exterior of the cuff 102 from a first set of surfaces A located on the interior of the cuff 102 further from the open end 110. This may allow the cuff 102 to external slip fit connect to a first diameter of a pipe via the first set of surfaces A through the open end 110, or alternatively to external slip fit connect to a second diameter of a pipe (larger than the first diameter) via the second set of surfaces B through the open end 110.

As a further illustrative example, a third set of surfaces C located on an exterior of the cuff 102 near the open end 110 may be offset toward the interior of the cuff 102 from a fourth set of surfaces D located on the exterior of the cuff 102 further from the open end 110, and the fourth set of surfaces D may in turn be offset toward the interior of the cuff 102 from a fifth set of surfaces E located on the exterior of the cuff 102 even further from the open end 110. This may allow the cuff 102 to internal slip fit connect to a third diameter of a pipe (larger than the second diameter) about the open end 110 via the third set of surfaces C, to alternatively internal slip fit connect to a fourth diameter of a pipe (larger than the third diameter) about the open end 110 via the fourth set of surfaces D, or to alternatively internal slip fit connect to a fifth diameter of a pipe (larger than the fourth diameter) about the open end 110 via the fifth set of surfaces E.

The various surfaces in the sets A-E can be sloped. This can yield a frusto-conical volume for receiving a pipe or fitting of a particular diameter. In the illustrated example, the internal surfaces (such as in the first set of surfaces A and in the second set of surfaces B) are sloped toward the open end 110 and toward the exterior of the cuff 102, while the external surfaces (such as in the third set of surfaces C, in the fourth set of surfaces D, and in the fifth set of surfaces E) are sloped toward the open end 110 and toward the interior of the cuff 102.

Sloping of a set of surfaces can allow the set of surfaces to receive a pipe or fitting that is within a certain tolerance of the average distance between the surfaces. For example, a pipe having a diameter that is equal to the average distance between the surfaces of the set of surfaces A may be inserted through the open end 110 of the cuff 102. This pipe may contact and engage the set of surfaces A at a midway point along the surfaces A. In contrast, a pipe having a diameter that is slightly larger than the average distance may contact and engage the set of surfaces A nearer the open end 110 (e.g., before reaching the midpoint), and a pipe having a diameter that is slightly smaller than the average distance may contact and engage the set of surfaces A further from the open end 110 (e.g., after passing the midpoint). Hence, a slope of the set of surfaces A may allow the set of surfaces A to receive a pipe having a diameter within a certain range or tolerance of a particular diameter.

The sets of surfaces A-E may be sloped between different reference points of the cuff 102. For example, the sets of surfaces A-E in FIG. 3 are illustrated as sloping between distances R1-R10 from an axis Z. The axis Z may correspond to a central axis about which the body 108 of the cuff 102 is defined (e.g., an axis extending parallel to a length of the body 108 and/or extending between two circular ends of a cylinder defining the body 108). The distances R1-R10 can correspond to a set of distances that form an ordered sequence of distances progressing from a first distance R1 to a tenth distance R10. In this sequence, each distance in the sequence is larger than the immediately preceding distance in the sequence. For example, as will be apparent from FIG. 3, R2 is greater than R1, R3 is greater than R2, and so on. Additionally, each of the sets of surfaces A-E slopes toward the open end 110 between particular distances of the set of distances.

Thus, with reference to FIG. 3, the cuff 102 includes a first set of sloped surfaces A arranged on the interior of the cuff 102 (e.g., on the interior fins 104 shown in FIG. 1) so as to slope from the first distance R1 to the second distance R2 in the set of distances, a second set of sloped surfaces B arranged on the interior of the cuff 102 (e.g., on the interior fins 104 shown in FIG. 1) so as to slope from the third distance R3 to the fourth distance R4 in the set of distances, a third set of sloped surfaces C arranged on the exterior of the cuff 102 (e.g., on the exterior fins 106 shown in FIG. 1) so as to slope from the sixth distance R6 to the fifth distance R5 in the set of distances, a fourth set of sloped surfaces D arranged on the exterior of the cuff 102 (e.g., on the exterior fins 106 shown in FIG. 1) so as to slope from the eighth distance R8 to the seventh distance R7 in the set of distances, and a fifth set of sloped surfaces E arranged on the exterior of the cuff 102 (e.g., on the exterior fins 106 shown in FIG. 1) so as to slope from the tenth distance R10 to the ninth distance R9 in the set of distances.

In embodiments utilizing fins (such as the internal fins 104 and the external fins 106 of FIG. 1), the slope of a set of surfaces (e.g., set A) may be a result of a radial thickness of a corresponding fin decreasing as the fin travels toward the open end 110. In various examples, the slope of an initial set of surfaces (e.g., the second set B) may begin at a point on the fin (e.g., corresponding to the location of R3 in FIG. 3) that has a smaller radial thickness of the fin than a point (e.g., corresponding to the location of R1 in FIG. 3) of termination of the slope of an adjacent set of surfaces that is further from the open end 110 (e.g., set A) than the initial set of surfaces.

In the illustrated example shown at the left side of FIG. 3, an internal fin can include a first thickness T1 extending from an inside surface 109 of the body 108. The first thickness T1 can taper toward the open end 110, decreasing in size as proximity to the open end 110 increases (e.g., tapering down from R1 to R2). The internal fin can also include a second thickness T2 that extends from the inside surface 109 of the body 108 by a smaller distance than the first thickness T1 (e.g., tapering down from R3 to R4). The first thickness T1 and the second thickness T2 can be separated by a first step S1, such as to provide a transition zone between the thicknesses T1 and T2 (e.g., tapering between R2 and R3).

Similarly, the exterior fin can include a series of decreasing thicknesses that may be tapered. For example, FIG. 3 illustrates a third thickness T3 extending from an outer surface 107 of the body 108 (e.g., tapering between R10 and R9), a fourth thickness T4 extending from the outer surface 107 of the body 108 by a smaller distance than the third thickness T3 (e.g., tapering down from R8 to R7), and a fifth thickness T5 extending from the outer surface 107 of the body 108 by a smaller distance than the fourth thickness T4 (e.g., tapering down from R6 to R5). A second step S2 can provide a transition zone between T3 and T4 (e.g., tapering down from R9 to R8), and a third step can provide a transition zone between T4 and T5 (e.g., tapering down from R7 to R6). Fins may also include steps that form transition zones from a thickness to a surface of the body 108. For example, the inner fin may include a fourth step S4 that transitions from the second thickness T2 to the inside surface 109 of the body 108 (e.g., tapering down from R4 to be flush with the inside surface 109), and the outer fin may include a fifth step S5 that transitions between the fifth thickness T5 and the outside surface 107 of the body 108 (e.g., tapering down from R5 to be flush with the outside surface 107). Although the steps S1-S5 are shown in FIG. 3 as sloped or tapered, any or all of the steps S1-S5 may alternatively be perpendicular to a surface of the body 108 or have other orientations. Additionally, in some examples, any or all of the steps S1-S5 may be omitted, e.g., such that any or all of the thicknesses T1-T5 that are adjacent to one another may directly transition from one to another.

Figure 4:
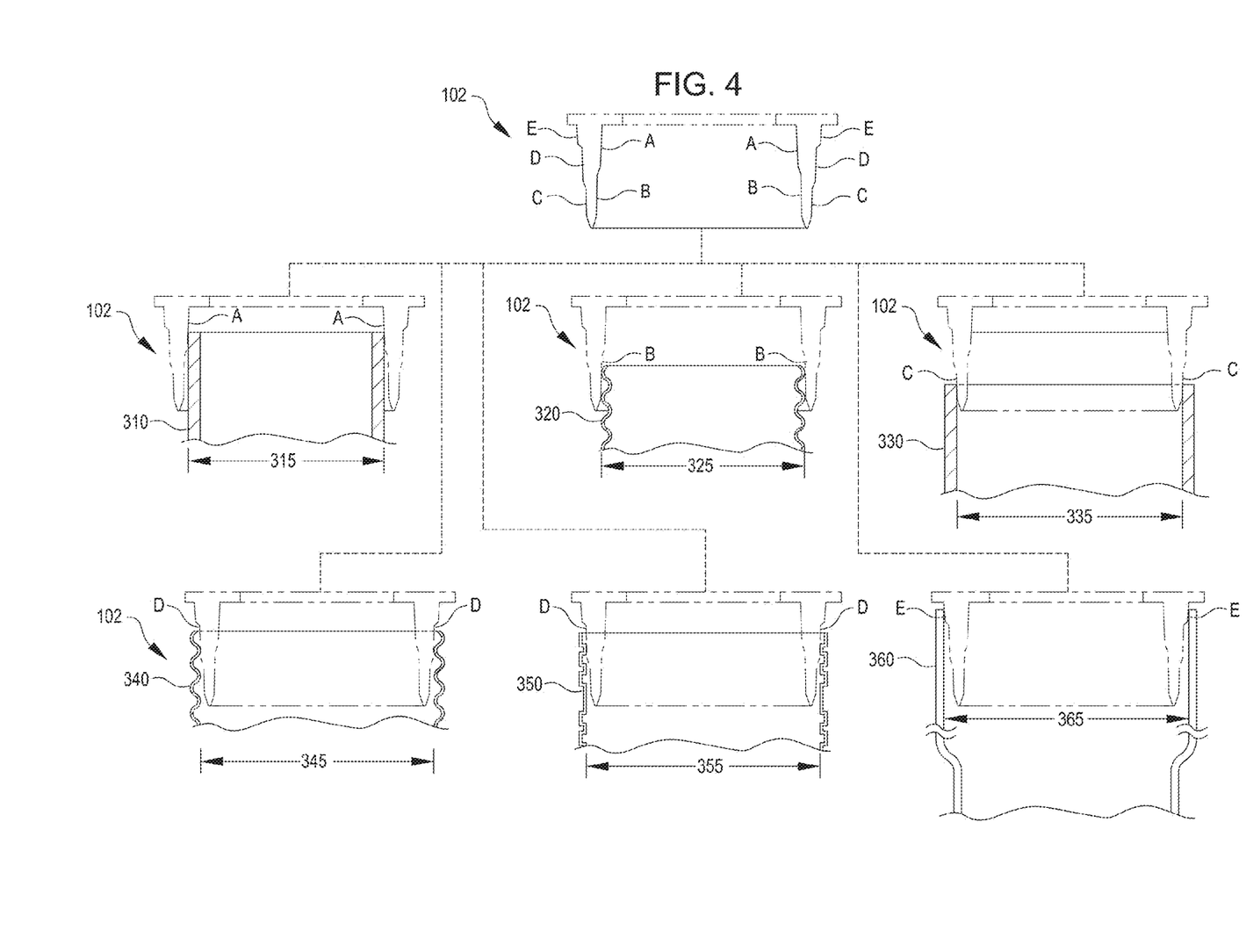
FIG. 4 is a schematic exploded assembly view illustrating alternative couplings of a universal cuff to different sizes of components.

FIG. 4 is a schematic exploded assembly view illustrating alternative coupling of a universal cuff 102 to different sizes of exemplary components. FIG. 4 illustrates that the different surfaces shown in FIG. 3 may be utilized to couple the cuff 102 with different types and sizes of components as alternatives to one another. This allows a single fitting component with the cuff 102 to be used with any of a variety of fitting components, thus reducing a number of fitting components needed for working with such a variety and providing attendant cost- and time-savings. Although specific types of components and/or dimensions are described with respect to FIG. 4, universal cuff 102 is not limited to these specific examples, but can additionally or alternatively be used with other types and/or sizes of components.

Beginning at the left of the middle row in FIG. 4, the first set of surfaces A of the cuff 102 are used to couple to or engage with a 3-inch Schedule 40 PVC pipe (referenced as 310 in FIG. 4). For example, referring to the distances described above with reference to FIG. 3, R1 may correspond to approximately 1.737 inches and R2 may correspond to approximately 1.763 inches. This may cause a space between opposite surfaces A (or a diameter of a circular cross-section formed by the surfaces A) to range between approximately 3.474 inches and 3.526 inches. This range may be particularly suited for receiving an outer diameter 315 of the 3-inch Schedule 40 PVC pipe 310 because the outer diameter 315 of the 3-inch Schedule 40 PVC pipe 310 is typically about 3.500 inches. The exact dimension of the outer diameter 315 (and related tolerances) may vary to some degree depending on the manufacturer of the 3-inch Schedule 40 PVC pipe 310 because industry standards tend to be more focused on inner diameters than outer diameters. The range provided by the sloped surfaces A may be suitable for accounting for this variance in the possible outer diameter 310 of the 3-inch Schedule 40 PVC pipe 310.

Continuing to the center of the middle row of FIG. 4, the second set of surfaces B of the cuff 102 are used to couple to or engage with a 3-inch corrugated pipe (referenced as 320 in FIG. 4). For example, referring to the distances described above with reference to FIG. 3, R3 may correspond to approximately 1.825 inches and R4 may correspond to approximately 1.845. This may cause a space between opposite surfaces B (or a diameter of a circular cross-section formed by the surfaces B) to range between approximately 3.650 inches and 3.690 inches. This range may be particularly suited for receiving an outer diameter 325 of the 3-inch corrugated pipe 320 because the outer diameter 325 of ridges on the 3-inch corrugated pipe 320 is typically about 3.667 inches. The exact dimension of the outer diameter 325 (and related tolerances) may vary to some degree depending on the manufacturer of the 3-inch corrugated pipe 320 because industry standards tend to be more focused on inner diameters than outer diameters. The range provided by the sloped surfaces B may be suitable for accounting for this variance in the possible outer diameter 325 of the 3-inch corrugated pipe 320.

Continuing to the right in the middle row of FIG. 4, the third set of surfaces C of the cuff 102 are used to couple to or engage with a 4-inch Schedule 40 PVC pipe (referenced as 330 in FIG. 4). For example, referring to the distances described above with reference to FIG. 3, R5 may correspond to approximately 1.999 inches and R6 may correspond to approximately 2.005 inches. This may cause a space between opposite surfaces C (or a diameter of a circular cross-section formed by the surfaces C) to range between approximately 3.998 inches and 4.010 inches. This range may be particularly suited for receiving an inner diameter 335 of the 4-inch Schedule 40 PVC pipe 330 because the inner diameter 335 of the 4-inch Schedule 40 PVC pipe 330 is typically specified as 4.000 inches.

Continuing at the left of the bottom row of FIG. 4, the fourth set of surfaces D of the cuff 102 are used to couple to or engage with a 4-inch corrugated pipe (referenced as 340 in FIG. 4). For example, referring to the distances described above with reference to FIG. 3, R7 may correspond to approximately 2.054 inches and R8 may correspond to approximately 2.070 inches. This may cause a space between opposite surfaces D (or a diameter of a circular cross-section formed by the surfaces D) to range between approximately 4.108 inches and 4.140 inches. This range may be particularly suited for receiving an inner diameter 345 of the 4-inch corrugated pipe 340 because the inner diameter 345 of valleys of the 4-inch corrugated pipe 340 is typically specified as 4.110 inches.

Continuing in the middle of the bottom row of FIG. 4, the fourth set of surfaces D of the cuff 102 may alternatively or additionally be used to couple to or engage with a standardized drain cuff (referenced as 350 in FIG. 4). For example, the standardized drain cuff 350 may have a similar diameter to the valleys of the 4-inch corrugated pipe 340 so that the standardized drain cuff 350 can also be received on features configured for receiving the 4-inch corrugated pipe 340. Such sizing may, for example, allow the standardized drain cuff 350 to act as a coupler for joining a feature configured for receiving the 4-inch corrugated pipe 340 with another feature configured for receiving the 4-inch corrugated pipe 340 or with a different pipe or feature. In an illustrative example, the standardized drain cuff 350 has an inner diameter 355 that is specified as 4.110 inches. Hence, the aforementioned range of space between opposite surfaces D (between approximately 4.108 inches and 4.140 inches) may be additionally or alternatively particularly suited for receiving an inner diameter 355 of the standardized drain cuff 350.

Concluding at the right of the bottom row of FIG. 4, the fifth set of surfaces E of the cuff 102 are used to couple to or engage with a 4-inch sewer fitting (referenced as 360 in FIG. 4). For example, referring to the distances described above with reference to FIG. 3, R9 may correspond to approximately 2.126 inches and R10 may correspond to approximately 2.150 inches. This may cause a space between opposite surfaces E (or a diameter of a circular cross-section formed by the surfaces E) to range between approximately 4.252 inches and 4.300 inches. This range may be particularly suited for receiving an inner diameter 365 of the 4-inch sewer fitting 360 (e.g., with a bell-end that flares out to an inner diameter 365 that is greater than the inner diameter 335 of the 4-inch Schedule 40 PVC pipe 330) because the inner diameter 365 of a bell-end of the 4-inch sewer fitting is typically specified as 4.263 inches.

Thus, as may be appreciated, FIG. 4 illustrates an example of a universal cuff 102 that may be utilized to alternatively couple to a 3-inch Schedule 40 PVC 310, to a 3-inch corrugated pipe 320, to a 4-inch Schedule 40 PVC pipe 330, to a 4-inch corrugated pipe 340, or to a 4-inch sewer fitting. The universal cuff 102 may additionally function to alternatively couple to other fittings, such as to a cuff of a standardized drain cuff 350. The specific pipe types and sizes of the preceding description are provided as illustrative examples, and universal cuffs may include features sized to accommodate other sets of five (or more or less) types of pipes without departing from the scope of this disclosure.

As previously noted, universal cuffs 102 additionally or alternatively can be provided on fitting components other than the drain cap 100 of FIGS. 1-2. Examples of such fitting components are illustrated in FIGS. 5-11.

Figure 5:
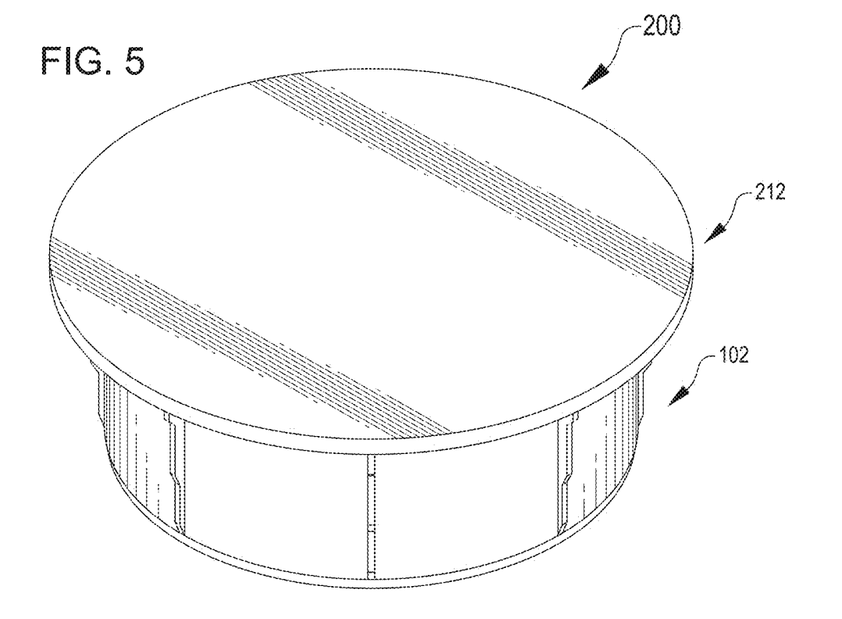
FIG. 5 is a bottom perspective view of an end cap having a universal cuff according to a non-limiting example.
Figure 6:
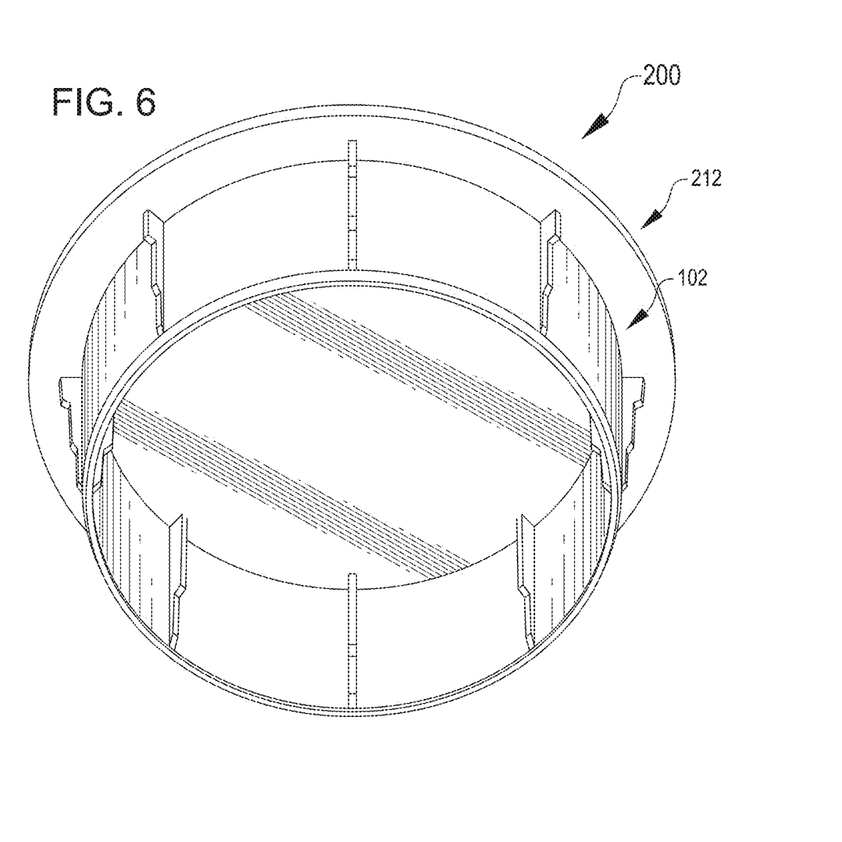
FIG. 6 is a top perspective view of the end cap of FIG. 5.

FIGS. 5 and 6 illustrate an end cap 200 with a universal cuff 102. In addition to the universal cuff 102, the end cap 200 includes an upper portion 212. For example, the upper portion 212 can be provided in lieu of the upper portion 112 of FIGS. 1-2. The upper portion 212 is shown in FIGS. 5-6 as a solid disc (e.g., having a continuous surface without the drainage apertures 114 of FIG. 1). For example, the end cap 200 may be utilized to seal an end of a pipe coupled with the end cap 200 and prevent debris from entering the pipe. As may be appreciated, features of the universal cuff 102 in FIGS. 5-6 may include similar dimensions to the universal cuff shown in FIG. 3, such as to provide an end cap 200 that will fit the same types of pipes described above with respect to FIG. 4.

Figure 7:
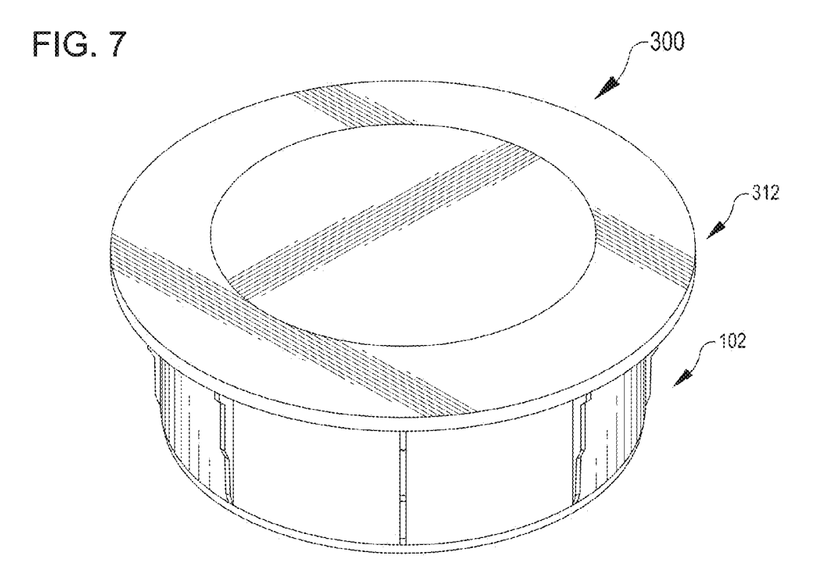
FIG. 7 is a top perspective view of a pop-up emitter fitting having a universal cuff according to one non-limiting example.
Figure 8:
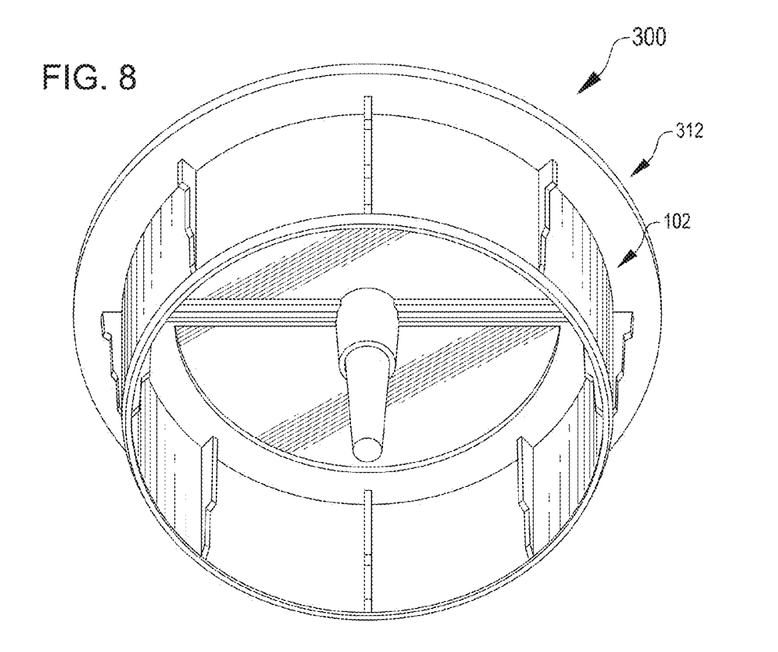
FIG. 8 is a bottom perspective view of the pop-up emitter fitting of FIG. 7.
Figure 9:
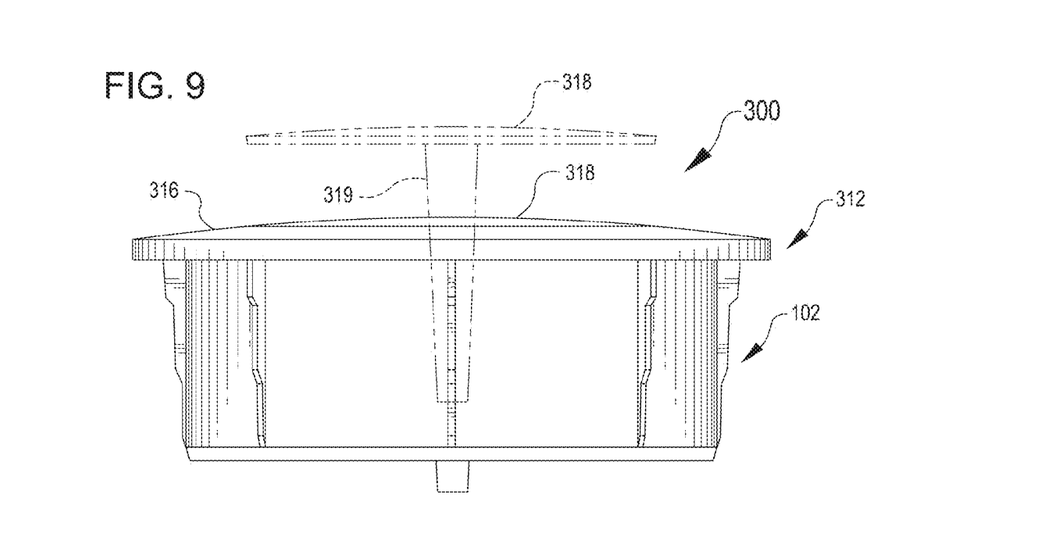
FIG. 9 is a side view of the pop-up emitter fitting of FIGS. 7-8.

FIGS. 7-9 illustrate a pop-up emitter 300 with a universal cuff 102. In addition to the universal cuff 102, the pop-up emitter 300 includes an upper portion 312. For example, the upper portion 312 can be provided in lieu of the upper portion 112 of FIGS. 1-2. As may best be appreciated with reference to FIG. 9, the upper portion 312 includes a base 316 and a lid 318. The lid 318 can be movable relative to the base 316, such as along a column 319 received in the base 316. For example, in FIG. 9, the lid 318 may move from the position shown in solid line to the position shown in phantom line. Movement of the lid 318 relative to the base 316 may be in response to a particular amount of fluid pressure under the lid 318 from a pipe coupled with the pop-up emitter 300. Hence, the pop-up emitter 300 may be utilized act as a discharge point of a drainage system, e.g., opening in response to particular conditions to allow fluid flow out of the pipe and away from structures (such as building foundations) that may be sensitive to the conveyed fluid. Features of the universal cuff 102 in FIGS. 7-9 may include similar dimensions to the universal cuff shown in FIG. 3, such as to provide a pop-up emitter 300 that will fit the same types of pipes described above with respect to FIG. 4.

Figure 10:
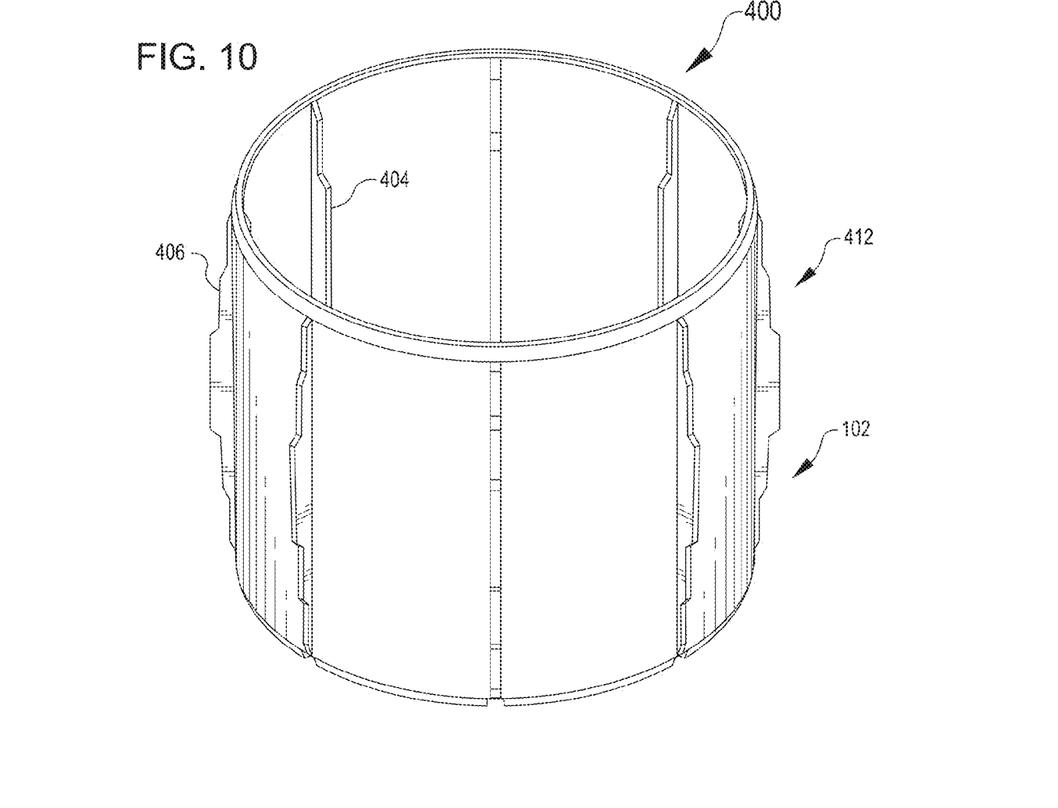
FIG. 10 is a top perspective view of an adaptor having a mirrored universal cuff according to a non-limiting example.
Figure 11:
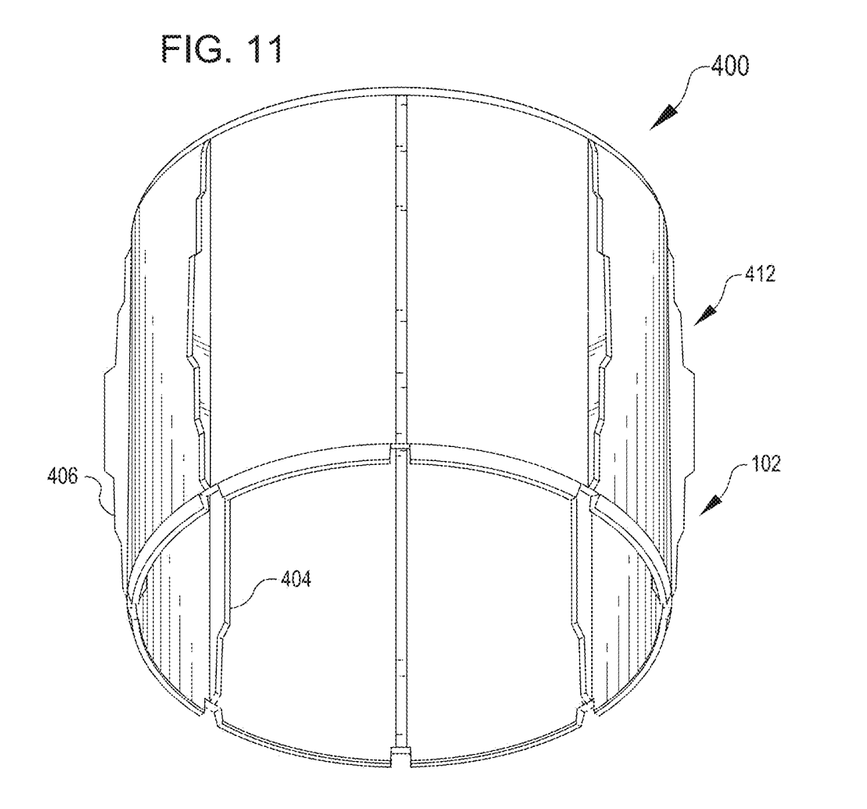
FIG. 11 is a bottom perspective view of the adaptor of FIG. 10.

FIGS. 10-11 illustrate an adaptor 400 with a universal cuff 102. In addition to the universal cuff 102, the adaptor 400 includes an upper portion 412. For example, the upper portion 412 can be provided in lieu of the upper portion 112 of FIGS. 1-2. The upper portion 412 can include surfaces that allow the adaptor 400 to be utilized as a junction between pipes or fittings, such as to couple one pipe or fitting to another pipe or fitting that may be the same or a different size. The upper portion 412 shown in FIGS. 10-11 is a mirror image of the universal cuff 102. For example, the internal fins 404 and the external fins 406 of the adaptor 400 shown in FIGS. 10-11 include a first set of sloped surfaces facing a first end (e.g., the top direction depicted in FIGS. 10-11) and a second set of sloped surfaces facing an opposite, second end (e.g., the bottom direction depicted in FIGS. 10-11). However, if desired, at least some portion of the top portion 412 may be shifted along a circumference or perimeter of the adaptor 400 from the universal cuff 102 (e.g., such that at least some bottom-facing sloped surfaces and at least some top-facing sloped surfaces are not aligned along a shared fin) or otherwise differ from the universal cuff 102 (such as including more or fewer sets of surfaces for engaging other pipes or fittings). Features of the universal cuff 102 in FIGS. 10-11 may include similar dimensions to the universal cuff shown in FIG. 3, such as to provide an adaptor 400 that will fit the same types of pipes described above with respect to FIG. 4. In such a situation, the adaptor 400 may permit a first pipe of any of the five (or more or less) types of pipes or fittings described above with respect to FIG. 4 to be coupled with and/or adapted to a second pipe of any of those five (or more or less) types of pipes or fittings.

Although the universal cuff illustrated and described includes five sets of surfaces, more or less surfaces may be used as desired. The slopes of these surfaces, and distances between each of the surfaces in a set of surfaces, are not limited to the examples described herein. As described, the universal cuff may include any suitable number of external and internal fins.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A drainage pipe fitting with a cuff comprising:
a body having a length, a central axis, and an open end;
interior fins on an interior of the body;
exterior fins on an exterior of the body; and
a plurality of sloped surfaces arranged along the length of the body and sloping toward the open end between distances of a set of distances defined from the central axis, the set of distances comprising an ordered sequence of distances progressing from a first distance to a tenth distance, each distance in the ordered sequence larger than an immediately preceding distance in the ordered sequence, the plurality of sloped surfaces including:
a) a first set of sloped surfaces A arranged on each of the interior fins so as to slope from the first distance to the second distance in the set of distances;
b) a second set of sloped surfaces B arranged on each of the interior fins so as to slope from the third distance to the fourth distance in the set of distances;
c) a third set of sloped surfaces C arranged on each of the exterior fins so as to slope from the sixth distance to the fifth distance in the set of distances,
d) a fourth set of sloped surfaces D arranged on each of the exterior fins so as to slope from the eighth distance to the seventh distance in the set of distances, and
e) a fifth set of sloped surfaces E arranged on each of the exterior fins so as to slope from the tenth distance to the ninth distance in the set of distances;
wherein the distances of the set of distances are sized for the cuff to alternatively:
engage a 3-inch Schedule 40 PVC pipe by receiving the 3-inch Schedule 40 PVC pipe on the first set of sloped surfaces A on the interior fins;
engage a 3-inch corrugated pipe by receiving the 3-inch corrugated pipe on the second set of sloped surfaces B on the interior fins;
engage a 4-inch Schedule 40 PVC pipe by receiving the 4-inch Schedule 40 PVC pipe on the third set of sloped surfaces C on the exterior fins;
engage a 4-inch corrugated pipe by receiving the 4-inch corrugated pipe on the fourth set of sloped surfaces D on the exterior fins or engage a cuff of a standardized drain cuff by receiving the cuff of the standardized drain cuff on the fourth set of sloped surfaces D on the exterior fins; or
engage a 4-inch sewer fitting by receiving the 4-inch sewer fitting on the fifth set of sloped surfaces E on the exterior fins.

2. The drainage pipe fitting of claim 1, wherein:
the first distance in the set of distances is 1.737 inches;
the second distance in the set of distances is 1.763 inches;
the third distance in the set of distances is 1.825 inches;
the fourth distance in the set of distances is 1.845 inches;
the fifth distance in the set of distances is 1.999 inches;
the sixth distance in the set of distances is 2.005 inches;
the seventh distance in the set of distances is 2.054 inches;
the eighth distance in the set of distances is 2.070 inches;
the ninth distance in the set of distances is 2.126 inches; and
the tenth distance in the set of distances is 2.150 inches.

3. The drainage pipe fitting of claim 1, wherein the drainage pipe fitting comprises a drainage cap and further comprises:

an upper portion connected with the cuff, the upper portion comprising drainage apertures through the upper portion.

4. The drainage pipe fitting of claim 1, wherein the drainage pipe fitting comprises an end cap and further comprises:
an upper portion connected with the cuff, the upper portion comprising a solid disc without drainage apertures through the upper portion.

5. The drainage pipe fitting of claim 1, wherein the drainage pipe fitting comprises a pop up emitter and further comprises:
an upper portion connected with the cuff, the upper portion comprising:
a base; and
a lid movable relative to the base in response to a change in fluid pressure within the cuff.

6. The drainage pipe fitting of claim 1, wherein the cuff comprises a first cuff and wherein the drainage pipe fitting comprises an adaptor and further comprises:
an upper portion connected with the first cuff, the upper portion comprising:
a second cuff having a plurality of sets of surfaces sized for receiving various sizes of pipe fittings.

7. The drainage pipe fitting of claim 6, wherein the second cuff is a mirror image of the first cuff.

8. A drainage pipe fitting having a cuff comprising:
1) a body with an open end;
2) interior fins on an interior of the body, the interior fins comprising:
a) a first set of surfaces sloped toward the open end and toward an exterior of the body, the first set of surfaces sloped and sized for the cuff to engage a 3-inch Schedule 40 PVC pipe by receiving the 3-inch Schedule 40 PVC pipe through the open end and on the first set of surfaces;
b) a second set of surfaces sloped toward the open end and toward an exterior of the body, wherein the second set of surfaces are sloped and sized for the cuff to engage a 3-inch corrugated pipe by receiving the 3-inch corrugated pipe through the open end and on the second set of surfaces;
3) exterior fins on an exterior of the body, the exterior fins comprising:
a) a third set of surfaces sloped toward the open end and toward an interior of the body, wherein the third set of surfaces are sloped and sized for the cuff to engage a 4-inch Schedule 40 PVC pipe by receiving the 4-inch Schedule 40 PVC pipe about the open end and on the third set of surfaces;
b) a fourth set of surfaces sloped toward the open end and toward an interior of the body, wherein the fourth set of surfaces are sloped and sized for the cuff to engage a 4-inch corrugated pipe by receiving the 4-inch corrugated pipe about the open end and on the fourth set of surfaces; and
c) a fifth set of surfaces sloped toward the open end and toward an interior of the body, wherein the fifth set of surfaces are sloped and sized for the cuff to engage a 4-inch sewer fitting by receiving the 4-inch sewer fitting about the open end and on the fifth set of surfaces.

9. The drainage pipe fitting of claim 8, wherein the second set of surfaces on the interior fins is offset toward the exterior of the body from the first set of surfaces on the interior fins.

10. The drainage pipe fitting of claim 8, wherein the fourth set of surfaces on the exterior fins is offset away from the interior of the body from the third set of surfaces on the exterior fins.

11. The drainage pipe fitting of claim 8, wherein the fourth set of surfaces is sloped and sized for the cuff to engage a cuff of a standardized drain cuff by receiving the cuff of the standardized drain cuff about the open end and on the fourth set of surfaces.

12. The drainage pipe fitting of claim 8, wherein the drainage pipe fitting comprises at least one of a drainage cap, an end cap, a pop-up emitter, or an adaptor.

13. The drainage pipe fitting of claim 8, wherein:
the first set of surfaces are sloped from a circular cross-section with a diameter of approximately 3.526 inches to a circular cross-section with a diameter of approximately 3.474 inches;
the second set of surfaces are sloped from a circular cross-section with a diameter of approximately 3.690 inches to a circular cross-section with a diameter of approximately 3.650 inches;
the third set of surfaces are sloped from a circular cross-section with a diameter of approximately 4.010 inches to a circular cross-section with a diameter of approximately 3.998 inches;
the fourth set of surfaces are sloped from a circular cross-section with a diameter of approximately 4.140 inches to a circular cross-section with a diameter of approximately 4.108 inches; and
the fifth set of surfaces are sloped from a circular cross-section with a diameter of approximately 4.300 inches to a circular cross-section with a diameter of approximately 4.252 inches.

14. A drainage pipe fitting with a cuff comprising:
a body defining a hollow tube;
a plurality of sloped surfaces arranged along the body, the plurality of sloped surfaces including:
a) a first set of sloped surfaces arranged on an interior of the cuff and sized to external slip fit connect the body to a first diameter of a pipe or a cuff;
b) a second set of sloped surfaces arranged on an interior of the cuff and sized to external slip fit connect the body to a second diameter of a pipe or a cuff;
c) a third set of sloped surfaces arranged on an exterior of the cuff and sized to internal slip fit connect the body to a third diameter of a pipe or a cuff;
d) a fourth set of sloped surfaces arranged on an exterior of the cuff and sized to internal slip fit connect the body to a fourth diameter of a pipe or a cuff; and
e) a fifth set of sloped surfaces arranged on an exterior of the cuff and sized to internal slip fit connect the body to a fifth diameter of a pipe or a cut internal fins on the interior of the cuff; and
external fins on the exterior of the cuff;
wherein the first set of sloped surfaces and the second set of sloped surfaces are arranged on the internal fins; and
wherein the third set of sloped surfaces, the fourth set of sloped surfaces, and the fifth set of sloped surfaces are arranged on the external fins.

15. The drainage pipe fitting of claim 14, wherein:
the first diameter is smaller than the second diameter;
the second diameter is smaller than the third diameter;
the third diameter is smaller than the fourth diameter; and
the fourth diameter is smaller than the fifth diameter.

16. The drainage pipe fitting of claim 14, wherein:
the first set of sloped surfaces is sized to external slip fit connect the body to a 3-inch Schedule 40 PVC pipe;

the second set of sloped surfaces is sized to external slip fit connect the body to a 3-inch corrugated pipe;

the third set of sloped surfaces is sized to internal slip fit connect the body to a 4-inch Schedule 40 PVC pipe;

the fourth set of sloped surfaces is sized to internal slip fit connect the body to a 4-inch corrugated pipe; and the fifth set of sloped surfaces is sized to internal slip fit connect the body to a 4-inch sewer fitting.

17. The drainage pipe fitting of claim 14, wherein the drainage pipe fitting comprises at least one of a drainage cap, an end cap, a pop-up emitter, or an adaptor.

18. The drainage pipe fitting of claim 14, wherein the cuff further comprises:
a central axis;
interior fins on an interior of the body;
exterior fins on an exterior of the body;
wherein the plurality of sloped surfaces are arranged along a length of the body and sloping toward the open end between distances of a set of distances defined from the central axis, the set of distances comprising an ordered sequence of distances progressing from a first distance to a tenth distance, each distance in the ordered sequence larger than the immediately preceding distance in the ordered sequence;
wherein the first set of sloped surfaces is arranged on the interior fins so as to slope from the first distance to the second distance in the set of distances, toward the open end, and toward the exterior of the body;
wherein the second set of sloped surfaces is arranged on the interior fins so as to slope from the third distance to the fourth distance in the set of distances, toward the open end, and toward the exterior of the body;
wherein the third set of sloped surfaces is arranged on the exterior fins so as to slope from the sixth distance to the fifth distance in the set of distances, toward the open end, and toward the interior of the body;
wherein the fourth set of sloped surfaces is arranged on the exterior fins so as to slope from the eighth distance to the seventh distance in the set of distances, toward the open end, and toward the interior of the body; and
wherein the fifth set of sloped surfaces is arranged on the exterior fins so as to slope from the tenth distance to the ninth distance in the set of distances, toward the open end, and toward the interior of the body;
wherein the distances of the set of distances are sized for the cuff to alternatively:
engage a 3-inch Schedule 40 PVC pipe by receiving the 3-inch Schedule 40 PVC pipe through the open end and on the first set of sloped surfaces on the interior fins;
engage a 3-inch corrugated pipe by receiving the 3-inch corrugated pipe on the second set of sloped surfaces through the open end and on the interior fins;

engage a 4-inch Schedule 40 PVC pipe by receiving the 4-inch Schedule 40 PVC pipe on about the open end and the third set of sloped surfaces on the exterior fins;

engage a 4-inch corrugated pipe by receiving the 4-inch corrugated pipe on the fourth set of sloped surfaces on the exterior fins or engage a cuff of a standardized drain cuff by receiving the cuff of the standardized drain cuff about the open end and on the fourth set of sloped surfaces on the exterior fins; or engage a 4-inch sewer fitting by receiving the 4-inch sewer fitting on the fifth set of sloped surfaces E about the open end and on the exterior fins.

19. A drainage pipe fitting having a cuff comprising:

1) a body with an open end, an inner surface, and an outer surface;

2) a plurality of interior fins on an interior of the body and projecting from the inner surface of the body, each of the interior fins of the plurality of interior fins comprising:
a) a first tapered thickness;
b) a second tapered thickness projecting from the inner surface of the body a smaller distance than the first tapered thickness, the second tapered thickness positioned between the open end of the body and the first tapered thickness;

3) a plurality of exterior fins on an exterior of the body and projecting from the outer surface of the body, each of the exterior fins of the plurality of exterior fins comprising:
a) a third tapered thickness;
b) a fourth tapered thickness projecting from the outer surface of the body a smaller distance than the third tapered thickness, the fourth tapered thickness positioned between the open end of the body and the third tapered thickness; and
c) a fifth tapered thickness projecting from the outer surface of the body a smaller distance than the fourth tapered thickness, the fifth tapered thickness positioned between the open end of the body and the fourth tapered thickness.

20. The drainage pipe fitting of claim 19, wherein the first tapered thickness is separated from the second tapered thickness by a first step, wherein the third tapered thickness is separated from the fourth tapered thickness by a second step, and wherein the fourth tapered thickness is separated from the fifth tapered thickness by a third step.

21. The drainage pipe fitting of claim 20, wherein the first step, the second step, and the third step are each tapered.

\* \* \* \* \*